United States Patent [19]

O'Donnell

[11] Patent Number: 4,460,285

[45] Date of Patent: Jul. 17, 1984

[54] FLANGED BEARING MOUNT

[75] Inventor: John F. O'Donnell, Peoria, Ill.

[73] Assignee: Development Engineering and Associates, Peoria, Ill.

[21] Appl. No.: 433,150

[22] Filed: Oct. 18, 1982

[51] Int. Cl.³ .................. F16C 23/04; F16C 33/74; F16C 35/02

[52] U.S. Cl. .................................. 384/152; 384/207; 384/428

[58] Field of Search ............ 308/186, 187.1, 194, 308/208, 245, 178; 384/152, 207, 208, 209, 210, 211, 212, 213, 215, 428, 438–441; 277/4, 183, 186, 178; 285/189, 220

[56] References Cited

U.S. PATENT DOCUMENTS

| | | |
|---|---|---|
| 1,242,582 | 10/1917 | Needham et al. |
| 1,627,558 | 5/1927 | Grunwald |
| 1,656,508 | 1/1928 | Claus |
| 1,984,464 | 12/1934 | Cohen |
| 2,277,635 | 3/1942 | Delaval-Crow ............... 308/178 X |
| 2,462,011 | 2/1949 | Thiry ................................ 384/220 |
| 2,591,221 | 4/1952 | Whiteley |
| 2,794,691 | 6/1957 | Noe .................................. 308/194 X |
| 2,812,987 | 11/1957 | Eilmann |
| 3,068,051 | 12/1962 | Koch ............................... 308/187.1 |
| 3,137,921 | 6/1964 | Hillberg |
| 3,179,476 | 4/1965 | Hurwitt ............................ 384/152 |
| 3,497,275 | 2/1970 | Hanley et al. ................... 384/152 |
| 3,966,275 | 6/1976 | Cain et al. ....................... 384/428 |
| 4,042,283 | 8/1977 | Cain et al. ....................... 384/207 |
| 4,047,768 | 9/1977 | Cain et al. ....................... 384/207 |
| 4,268,096 | 5/1981 | Cain et al. ....................... 384/428 |

Primary Examiner—Stuart S. Levy
Assistant Examiner—Thomas R. Hannon
Attorney, Agent, or Firm—David H. Hill

[57] ABSTRACT

A bearing mounting member having a first portion adapted to engage and hold a bearing housing, and a second portion in the form of a flange for engaging and being secured to a cooperating support surface, and including an annular groove formed in such second portion for enhancing the strength of such flange and concomitants facilitating the formation of a seal to such support surface.

1 Claim, 3 Drawing Figures

U.S. Patent    Jul. 17, 1984    4,460,285
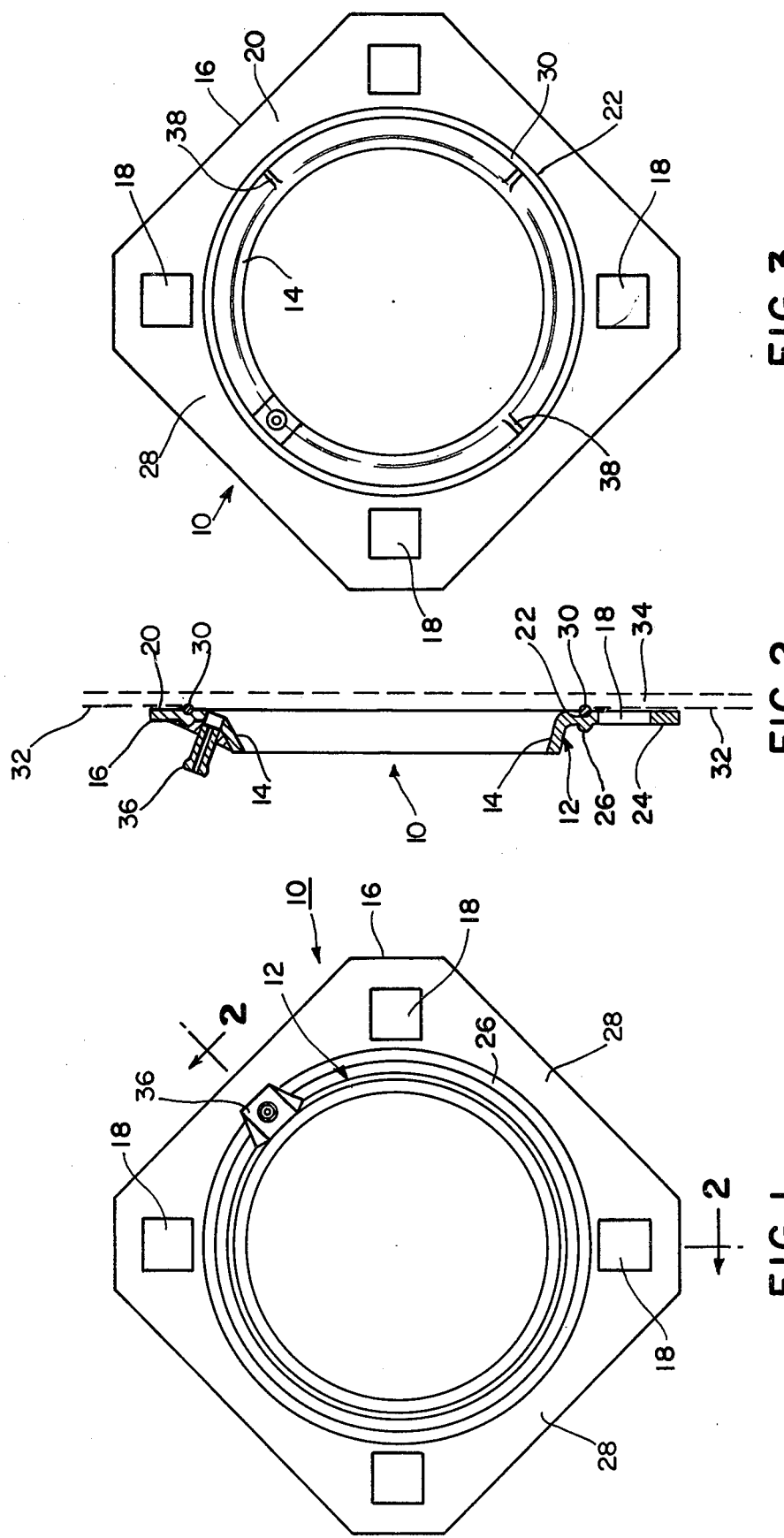

FLANGED BEARING MOUNT

BACKGROUND OF THE INVENTION

This invention pertains generally to bearing mounting members and the like, and more particularly to means for sealing such mounting members to a cooperating supporting surface for preventing the passage of dirt, moisture and the like therebetween.

DESCRIPTION OF THE PRIOR ART

Flanged bearing mounts or the like of various forms are well known in the art, whereby a bearing may be supported for journalling a rotary shaft therein relative to a plate or the like through which the rotary shaft extends. In general, the prior-art bearing mounts include a first portion adapted to conform to at least a portion of the external surface of a rotary bearing mounted therein, along with a second, and usually planar, flanged portion generally orthogonal to the axis of the rotary bearing. In some instances these prior-art bearing mounts include a grease fitting communicating with an annular groove on the inner surface of such first portion of the bearing mount, whereby lubricant may be supplied to a relubricable bearing mounted therein.

In the field of self-aligning spherical bearings, the means for mounting such bearings have been formed of both cast metal and pressed steel. The former provides a relatively heavy and, correspondingly, strong mount, serving well in heavy-duty installations, and usually comprising a single, integral member for clasping the bearing; however, cast metal members are both expensive and difficult to work with. Pressed or formed steel mounts, on the other hand, are lighter, more economical and easier to work with, and may also comprise a single, integral member for clasping the bearing, or, alternatively, may comprise a mating pair of flanged members which together clasp the self-aligning bearing.

Examples of the patented art on this subject include U.S. Pat. Nos. 2,794,691, to F. Noe, and 4,268,096, 3,996,265, 4,033,641, 4,042,283 and 4,047,768, all to E. S. Cain et al.. The Noe patent is illustrative of the simplist of structures in this art, comprising a one-piece or integral pressed steel flanged mount for a spherical bearing. The Cain et al. patents also all pertain to pressed sheet steel integral or "one-piece" flanged mounts or pillow blocks most of which are relatively complicated.

An inspection of such prior art patents, however, shows no effort for providing means for effecting a dirt or moisture seal between the flange and the cooperating support surface.

Further, my copending domestic patent application Ser. No. 493,784, filed May 17, 1983, relates to this field of endeavor and discloses a pair of cooperating flanged mounting members, each member including a single means (or a single group of means) for both mechanically strengthening the flange and aiding in the alignment of the cooperating members.

SUMMARY OF THE INVENTION

The present invention distinguishes over the aforementioned prior art by providing means for effecting a dirt or moisture seal between an individual flange and a cooperating support surface, the latter being either a housing wall or another planar support surface, such as the mating face of a cooperating flange member where a pair of flanged members are employed.

In accordance with the present invention, an annular groove is provided on the inwardly-facing surface of the flange, as opposed to the portion of the bearing mount contacting the bearing per se, whereby a dirt seal is effected between the flange and the adjacent supporting surface by means of an O-ring positioned in such groove or by means of grease or other flowable material occupying such groove.

Where the mounting flange is of restricted dimensions, structural strength thereof comes into question, and in accordance with the present invention this problem is overcome by the formation of the annular groove by coining, the resultant configuration providing increased structural strength.

BRIEF DESCRIPTION OF THE DRAWINGS

FIG. 1 is a plan view of the outer face of the bearing mount of the present invention, FIG. 2 is a sectional view taken on line 2—2 in FIG. 1, and FIG. 3 is a plan view of the inner face of the bearing mount of FIG. 1.

DESCRIPTION OF A PREFERRED EMBODIMENT

The three figures of drawings illustrate one form of a bearing mount 10 in accordance with the present invention, including a first portion 12 the inner face 14 of which is spherical in order to conform to the outer surface of a spherical bearing assembly (not shown) to be mounted. It will be understood that the bearing to be mounted may be any of a variety of different shapes, and that the surface 14 will be similarly shaped in order to conform thereto and constitute a support means therefor.

A second portion of mount 10 comprises a flange 16, having a plurality of mounting apertures 18 therein. In FIGS. 1 and 3, four mounting apertures 18 are illustrated, but it will be understood that the number of mounting apertures 18, as well as the shape of flange 16, may be varied in accordance with the needs of a given installation, the flange being triangular, square, rectangular, elliptical or round, for example, and the number of mounting apertures varying accordingly.

The inner face 20 of flange 16 (the face which adjoins a supporting surface in use) includes a coined annular groove 22, and the outer face 24 of flange 16 includes a corresponding annular raised ring 26 formed in the coining of groove 22. It will appreciated by those skilled in the art that the formation of groove 22 by coining, and the resultant formation of ring 26 both serve to add structural strength to the mount, and this is a particularly desirable feature where the flange width is materially decreased, as at 28, in comparison to the other portions of the flange 16.

Groove 22 is filled throughout its length by a resilient O-ring or, alternatively, by a grease fill, both of which are indicated by the reference numeral 30. Irrespective of which substance is utilized to fill groove 22, a dirt seal is formed thereby in cooperation with the adjacent face 32 of a supporting member 34, shown in phantom lines in FIG. 2.

Where the bearing mounted in the mounting means of the present invention is relubricable, a grease fitting 36 is provided, as shown, the central channel of which communicates with the inner face 14 of bearing-gripping first portion 12 of the bearing mount 10, as is common in the prior art, serving to introduce lubricant between the inner surfaces of mount 10 and the bearing assembly held therein. Further, where sealing groove 22 is to be filled with the lubricant, a pluraltiy of radial grooves 38 extending to groove 22 permits flow of the centrally-located lubricant outwardly to and into groove 22.

The invention has been described in some detail, and particularly with respect to its use in connection with the mounting of a bearing for supporting a shaft for rotation relative to a support structure. However, it will be apparent to those skilled in the art that the concept of the present invention is also applicable to other structures, including the support of non-rotary shafts. Hence, the invention should not be considered limited to the particular details given in connection with a description of a preferred embodiment, but only insofar as limited by the appended claims.

What is claimed is:

1. A flanged mounting member for an antifriction bearing or the like, comprising:

an annular member the internal face of which conforms to at least a portion of the external face of a bearing assembly to be mounted therein, a flange integral with and encompassing said annular member, said flange having two opposed faces one of which conforms to a support surface upon which it is to be mounted, said one face and said internal face being contiguous and together defining a continuous interior surface of the flanged mounting member, an annular groove on said one face of said flange and positioned substantially concentrically with respect to said annular member, said groove being adapted to be filled with a flexible material for sealing said flange to such support surface against the passage of dirt therebetween, an annular upstanding ring on the other of said two opposed faces of said flange, said upstanding ring being in registry with said annular groove and resulting from the formation of said groove, whereby the displacement of material occasioned by the concomitant formation of said groove and said ring serves to mechanically strengthen said flange, a lubricant fitting communicating with said interior surface, whereby lubricant may be forced through said fitting into the interior of said mounting member for application to a bearing assembly therein, and at least one groove communicating with said annular groove and extending inwardly therefrom on said one face, whereby flow of lubricant to said annular groove may be facilitated.

* * * * *